Sept. 27, 1955  H. W. COOVER, JR., ET AL  2,719,176
CONTINUOUS METHOD OF MAKING N-SUBSTITUTED AMIDES
Filed Feb. 5, 1953
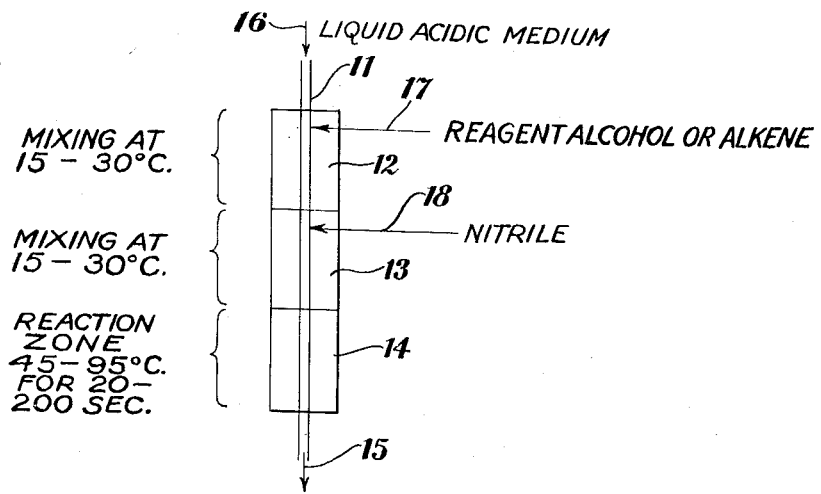
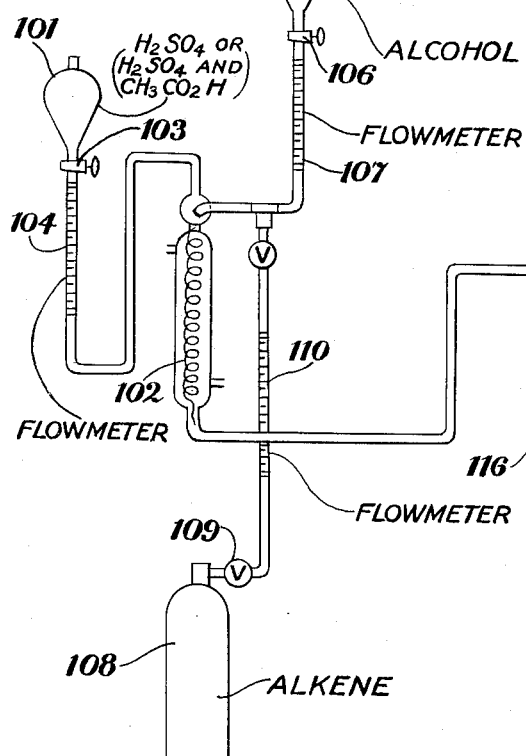
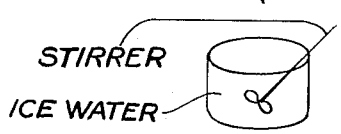
Harry W. Coover, Jr.
Newton H. Shearer, Jr.
INVENTORS
BY
ATTORNEYS

United States Patent Office 2,719,176
Patented Sept. 27, 1955

2,719,176
CONTINUOUS METHOD OF MAKING N-SUBSTITUTED AMIDES

Harry W. Coover, Jr., and Newton H. Shearer, Jr., Kingsport, Tenn., assignors to Eastman Kodak Company, Rochester, N. Y., a corporation of New Jersey Application February 5, 1953, Serial No. 335,296

4 Claims. (Cl. 260—561)

The present invention relates to a continuous process for the production of N-substituted amides. More particularly, the invention is concerned with a method for continuously reacting nitriles with secondary or tertiary alcohols or alkenes in an acidic medium.

This invention is particularly valuable for the production of such monomers as N-isopropylacrylamide, N-tertiarybutylacrylamide, methacrylamides and so forth. These monomers are valuable modifiers for the production of modified polyacrylonitriles. The water-soluble polymers obtainable from these monomers are also potentially valuable as sizing agents, thickeners, water-soluble fibers and so forth.

It is known that these N-substituted amides can be prepared from nitriles and alcohols or alkenes by batch technique on a small scale. However, on a large scale the dissipation of the heat of reaction becomes a problem. The gradual mixing which is necessary if the reaction temperature in a large batch preparation is to be controlled may require an hour or more. During this period, side reactions such as polymerization of the olefin and hydrolysis of the nitrile to unsubstituted amide cause a decrease in both the yield and the quality of the product.

The present invention has as an object the avoidance of the disadvantage of side reactions and has as a further object the provision of a continuous operation capable of producing the amides in good yield. Another object is to provide a process by means of which a sufficiently complete reaction may be achieved within a relatively extremely short time. Additional objects will be obvious from the following specification and claims.

In furtherance of the objects of the invention, we have discovered that if the substances requisite to the reaction are contacted under the conditions of a novel manipulative procedure, the reaction may be conducted continuously and with a practical reaction time of as little as 20 seconds without formation of excessively large percentages of by-products such as polymers.

In accordance with our discovery, the present invention comprises a continuous process for the preparation of N-substituted amides in accordance with the following equation:

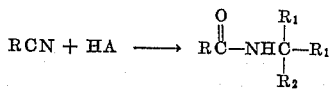

where R is an aryl, alkyl or alkenyl radical, A is a monovalent secondary or tertiary alkylol radical or a monovalent secondary or tertiary alkenyl radical, $R_1$ is an aryl or alkyl radical derived from A, and $R_2$ is hydrogen or an aryl or alkyl radical derived from A.

In general terms, the novel continuous manipulative procedure of the invention comprises carrying out the reaction in steps which comprise (a) forming a continuously flowing nonreactive stream of reaction components by means of step-wise addition of the components and by means of heat exchange conducted to maintain always a temperature below reaction temperature within the stream, (b) heating the stream to a low temperature within the reaction temperature range for a relatively very short period of time within the range of 20 to 200 seconds and (c) continuously and immediately thereafter quenching the thus heated stream containing a reaction product mixture.

The two specific reactions of the invention are best represented by the following two equations in which R is an aryl, alkyl or alkenyl radical, $R_1$ is an aryl or alkyl radical and $R_2$ is hydrogen or an aryl or alkyl radical:

(A) 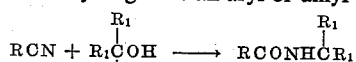

(B) 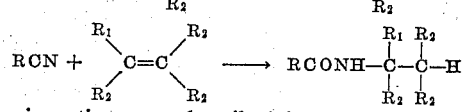

The invention may described in more detail as contemplating, in an advantageous embodiment thereof, the continuous feeding of an acidic medium such as a 80–95 percent sulfuric acid solution or an acetic acid-sulfuric acid solution, into an efficient heat exchanger in which reagent, i. e. alcohol (or alkene) is continuously added to the acid with continuous removal of the heat of solution, and the subsequent continuous addition of a nitrile to a continuously flowing stream of the thus formed alcohol-acid solution (or alkene-acid solution) with continuous removal of the heat of reaction, whereupon the resulting solution of reaction components, after thorough mixing, is passed as a continuously flowing stream through a heat exchanger in which the reaction component solution is maintained at a temperature in the range of 45–95° C. for a period of time in the range of 20 to 200 sec., the reaction product mixture immediately then being continuously added to a constantly stirred mixture of ice and water.

The invention is illustrated in the accompanying drawings in which:

Fig. 1 is a diagrammatic representation of generic means for carrying out the manipulative procedure of the invention, and Fig. 2 is a more specific apparatus embodiment suitable for practice of the invention.

With reference to Fig. 1, an apparatus of a generic type is illustrated. The apparatus includes heat exchanging and liquid mixing elements connected in series to accommodate the continuous flow therethrough of a liquid stream, the main liquid transporting line which is continuous from one end to the other of the apparatus being designated by the reference numeral 11. The three principal elements consist of mixing and exchanging device 12 in which reagent is introduced, mixing and exchanging device 13, in which nitrile is introduced and finally reacting and exchanging chamber 14 in which reaction is initiated and carried to completion prior to a quenching step. In operation of the apparatus of Fig. 1, liquid acidic medium is introduced as indicated by the arrow 16 into one end of the liquid transporting line 11 through which it flows as a continuous stream. Reagent, i. e. alcohol or alkene is introduced into the line 16 within the device 12 as indicated by arrow 17. Complete mixing and removal of the heat of solution is accomplished within device 12 upon the solution flowing therethrough. The solution leaving device 12 flows continuously into device 13, in which nitrile is first introduced into the line 11 as indicated by arrow 18. Complete mixing of the nitrile with the acidic medium and reagent is completed in the device 13 to form a continuously flowing reaction component mixture stream and heat of solution of the nitrile is removed at a rate which prevents the solution from reaching reaction temperature. The reaction component mixture flowing continuously from device 13 into chamber 14 is heated within the latter to reaction temperature and discharged therefrom as a continuously flowing stream after having been subjected to the elevated temperature for a controlled predetermined amount of time. The mixture of reaction products formed by reaction within chamber 14 is continuously and immediately after discharge from chamber 14 introduced into a quenching device (not shown) containing ice and water, as indicated by the arrow 15.

The method as practiced in the apparatus of Fig. 2 is carried out in the following manner. From flask 101 sulfuric acid (or a mixture of sulfuric acid and acetic acid) is allowed to flow continuously into the top of spiral condenser 102. The rate of flow is controlled by means of a stopcock 103 and measured by a flowmeter 104. From flask 105 the alcohol (or liquid alkene) is also added at the top of spiral condenser 102. The alcohol (or liquid alkene) rate of flow is controlled by stopcock 106 and measured by meter 107. When an alkene which is a gas at room temperature is to be employed, it may be admitted from a cylinder 108 under control of valve 109 and measured by meter 110. Either the flask 105 or the cylinder 108 is used alone. They are not both used at the same time.

As the mixture of alcohol and acid flows down through spiral condenser 102, it becomes thoroughly mixed and the heat of solution is dissipated by cool water running through the condenser jacket.

The mixture runs on into the top of spiral condenser 111 where the nitrile is added at a measured (by meter 112) and controlled (by stopcock 113) rate from flask 114. Cool water is run through the jacket of condenser 111 to dissipate the heat of solution of the nitrile and to allow the reaction components, i. e. acid medium, alcohol (or alkene) and nitrile to become well mixed before undergoing reaction in condenser 115. The inner spiral core 116 of condenser 111 is not maintained full. The reaction mixture flows down through it in the form of a relatively thin film.

The reaction is effected in condenser 115 where heated water is pumped through the condenser jacket to bring the temperature of the reaction components to within the reaction temperature range. The water temperature may be regulated easily by means of a thermostatically controlled water bath.

The contact time for the reaction in condenser 115 can be regulated in two ways. First, by regulating the rate of feed of the reagents. This would be preferable where the reaction is carried out on a large scale in heavy commercial type equipment. In apparatus of the type illustrated in Fig. 2, the stopcock 117 at the bottom of condenser 115 furnishes a convenient means of regulating the contact time. With a given rate of feed of all reagents the stopcock may be left completely open so that the reagents flow rapidly through in a thin film. This gives a relatively short contact time, for example, 20 seconds. On the other hand, the stopcock may be partially closed so as to maintain the inner spiral core 118 of condenser 115 completely full of reaction mixture. In this way longer contact times, for example, 200 seconds, result. By suitable adjustment of the stopcock, intermediate contact times can be obtained. After reaction, the reacion produc mixture is immediately quenched in a stirred mixture of ice and water and isolated by customary means.

In the case of the secondary alcohols, the preferred relative feed rates are about 1 mole of alcohol and about one mole of nitrile per 2.5–3.5 moles of concentrated sulfuric acid. In the case of alkenes or tertiary alcohols, it is preferred to feed a ratio of approximately 1 mole of alkene (or alcohol) to approximately 1 mole of nitrile and 0.8–1.2 moles of sulfuric acid containing acetic acid or water as a diluent. It is preferred to employ sulfuric acid in the concentration range of 85–95 percent for secondary alcohols. For tertiary alcohols or alkenes, it is preferred to employ 90–95 percent sulfuric acid diluted with from 3–5 volumes of acetic acid or 80–90 percent aqueous sulfuric acid.

After being mixed into the ice and water and quenched, the reaction product mixture is neutralized with sodium carbonate and, if necessary, extracted with ether, benzene, or isopropyl acetate. If the product is a slightly soluble solid, it can be conveniently separated by filtration after the sodium carbonate neutralization step.

The invention is illustrated in the following examples:

*Example 1.—N-isopropylacrylamide*

14.6 grams of 94 percent sulfuric acid was fed into the reactor at a rate of 15.5 g. per minute. Isopropanol was added at a rate of 3.0 g. per minute and acrylonitrile was added at a rate of 2.7 g. per minute. The reaction mixture was maintained at 63° C. for 200 seconds. A sample of the reaction mixture was then poured onto ice and water, neutralized with sodium carbonate, and extracted with isopropyl acetate. The extract was evaporated to give a 90 percent yield of N-isopropylacrylamide.

*Example 2.—N-isopropylacrylamide*

The procedure of Example 1 was followed with maintenance of the reaction mixture at 75° C. for 46 seconds. The yield of N-isopropylacrylamide was nearly quantitative.

*Example 3.—N-isopropylacrylamide*

The procedure of Example 1 was followed, with maintenance of the reaction mixture at 90° C. for 20 seconds. The yield of N-isopropylacrylamide was nearly quantitative.

*Example 4.—N-isopropylacrylamide*

A solution of 94 percent sulfuric acid in acetic acid was added to the reactor at a rate of 4.9 grams of sulfuric acid and 15 g. of acetic acid per minute. Propylene was admitted at the rate of 2.1 g. per minute and acrylonitrile was added at a rate of 2.7 g. per minute. The reaction mixture was maintained at 80° C. for 20 seconds. The product was isolated by the procedure of Example 1.

*Example 5.—N-t-butylacetamide*

A solution of sulfuric acid and acetic acid was fed into the reactor at a rate of 5.0 grams of sulfuric acid and 12 grams of acetic acid per minute. Tertiary-butyl alcohol was admitted at a rate of 3.7 g. per minute. Acetonitrile was admitted at a rate of 2.05 g. per minute. The reaction mixture was maintained at 50° C. for 200 seconds. The product was isolated by the procedure of Example 1.

We claim:

1. In the process for the preparation of an N-substituted amide by means of the reaction of a nitrile with a reagent selected from the group consisting of secondary alkenes, tertiary alkenes, secondary alcohols, and tertiary alcohols in the proportion of about one mole of nitrile per mole of reagent and in the presence of about 0.8 to about 3.5 moles of an aqueous solution comprising 80–95% sulphuric acid at a temperature of about 45° C. to about 95° C., an improvement consisting in a continuous rapid, and substantially quantitative method for carrying out said preparation, said method comprising the steps of (1) forming with the acid solution a continuously flowing first stream, (2) continuously adding the proportionately proper amount of the reagent to the first stream and forming a continuously flowing second stream thereby, (3) continuously cooling the second stream simultaneously with formation thereof and maintaining the temperature thereof at a level below about 45° C., and below the temperature of reaction of the nitrile with the reagent, (4) continuously adding the proportionately proper amount of nitrile to the cooled second stream and forming a continuously flowing third stream thereby, (5) continuously cooling the continuously flowing third stream simultaneously with formation thereof to maintain the temperature thereof at a level below about 45° C. and below the reaction temperature of the nitrile and the reagent, (6) continuously warming the continuously flowing cooled third stream to a reaction temperature within the range of about 45° C. to about 95° C. and initiating reaction between the nitrile and the reagent thereby, (7)

continuously maintaining the temperature of the thus warmed continuously flowing third stream at least at reaction temperature for a controlled short period of time within the range of about 20 to 200 seconds and forming thereby a continuously flowing product mixture stream, (8) continuously introducing the continuously flowing product mixture stream into a quenching zone immediately upon completion of the controlled short period, (9) immediately and continuously chilling the product mixture stream as it enters the quenching zone by reducing the temperature of the stream to a point substantially below 45° C. and forming thereby a quenched product batch, and (10) recovering N-substituted amide from the thus formed quenched product batch.

2. In the process for the preparation of N-isopropylacrylamide from isopropanol and acrylonitrile in the presence of an aqueous solution comprising 80–95% sulfuric acid, an improvement consisting in a continuous, rapid, and substantially quantitative method for carrying out said preparation, said method comprising the steps of (1) forming a continuously flowing first stream consisting of the acid solution (2) continuously adding to the continuously flowing first stream about 1 part by weight of the isopropanol to about 5 parts by weight of the stream and forming a continuously flowing second stream thereby, (3) continuously cooling the second stream simultaneously with formation thereof and maintaining the temperature thereof at a level below the temperature of reaction of the nitrile with the isopropanol, (4) continuously adding to the cooled second stream about 1 part by weight of acrylonitrile per part by weight of the isopropanol therein and forming a continuously flowing third stream thereby, (5) continuously cooling the continuously flowing third stream simultaneously with formation thereof and maintaining the temperature thereof at a level below the reaction temperature of the nitrile and the isopropanol, (6) continuously warming the continuously flowing cooled third stream to a reaction temperature within the range of about 45° C. to about 95° C. and initiating reaction between the nitrile and reagent thereby, (7) continuously maintaining the temperature of the thus warmed continuously flowing third steam at least at the reaction temperature for a controlled short period of time within the range of about 20 to 200 seconds and forming thereby a continuously flowing product mixture stream, (8) continuously introducing the continuously flowing product mixture stream into a quenching zone immediately upon completion of the controlled short period, (9) immediately and continuously chilling the product mixture stream as it enters the quenching zone by reducing the temperature thereof to a point substantially below 45° C., and forming thereby a quenched product batch, and (10) recovering N-isopropylacrylamide from the quenched product batch.

3. In the process for the preparation of N-isopropylacrylamide from propylene and acrylonitrile in the presence of an aqueous solution comprising 80–95% sulfuric acid, an improvement consisting in a continuous, rapid, and substantially quantitative method for carrying out said preparation, said method comprising the steps of (1) forming a continuously flowing first stream consisting of the acid solution (2) continuously adding to the continuously flowing first stream about 1 part by weight of the propylene to about 5 parts by weight of the stream and forming a continuously flowing second stream thereby, (3) continuously cooling the second stream simultaneously with formation thereof and maintaining the temperature thereof at a level below the temperature of reaction of the nitrile with the propylene, (4) continuously adding to the cooled second stream about 1 part by weight of acrylonitrile per part by weight of the propylene therein and forming a continuously flowing third stream thereby, (5) continuously cooling the continuously flowing third stream simultaneously with formation thereof and maintaining the temperature thereof at a level below the reaction temperature of the nitrile and the propylene, (6) continuously warming the continuously flowing cooled third stream to a reaction temperature within the range of about 45° C. to about 95° C. and initiating reaction between the nitrile and reagent thereby, (7) continuously maintaining the temperature of the thus warmed continuously flowing third stream at least at the reaction temperature for a conrolled short period of time within the range of about 20 to 200 seconds and forming thereby a continuously flowing product mixture stream, (8) continuously introducing the continuously flowing product mixture stream into a quenching zone immediately upon completion of the controlled short period, (9) immediately and continuously chilling the product mixture stream as it enters the quenching zone by reducing the temperature thereof to a point substantially below 45° C., and forming thereby a quenched product batch, and (10) recovering N-isopropylacrylamide from the quenched product batch.

4. In the process for the preparation of N-t-butyl-acetamide from tertiary-butyl alcohol and acetonitrile in the presence of an aqueous solution comprising 80–95% sulfuric acid, an improvement consisting in a continuous, rapid, and substantially quantitative method for carrying out said preparation, said method comprising the steps of (1) forming a continuously flowing first stream consisting of the acid solution (2) continuously adding to the continuously flowing first stream about 1 part by weight of the tertiary-butyl alcohol to about 5 parts by weight of the stream and forming a continuously flowing second stream thereby, (3) continuously cooling the second stream simultaneously with formation thereof and maintaining the temperature thereof at a level below the temperature of reaction of the nitrile with the tertiary-butyl alcohol, (4) continuously adding to the cooled second stream about 1 part by weight of acetonitrile per part by weight of the tertiary-butyl alcohol therein and forming a continuously flowing third stream thereby, (5) continuously cooling the continuously flowing third stream simultaneously with formation thereof and maintaining the temperature thereof at a level below the reaction temperature of the nitrile and the tertiary-butyl alcohol, (6) continuously warming the continuously flowing cooled third stream to a reaction temperature within the range of about 45° C. to about 95° C. and initiating reaction between the nitrile and reagent thereby, (7) continuously maintaining the temperature of the thus warmed continuously flowing third stream at least at the reaction temperature for a controlled short period of time within the range of about 20 to 200 seconds and forming thereby a continuously flowing product mixture stream, (8) continuously introducing the continuously flowing product mixture stream into a quenching zone immediately upon completion of the controlled short period, (9) immediately and continuously chilling the product mixture stream as it enters the quenching zone by reducing the temperature thereof to a point substantially below 45° C., and forming thereby a quenched product batch, and (10) recovering N-isopropylacrylamide from the quenched product batch.

References Cited in the file of this patent

UNITED STATES PATENTS

| | | |
|---|---|---|
| 2,375,256 | Soday | May 8, 1945 |
| 2,457,660 | Gresham et al. | Dec. 28, 1948 |
| 2,573,673 | Ritter | Oct. 30, 1951 |
| 2,601,387 | Gresham et al. | June 24, 1952 |
| 2,628,216 | Magat | Feb. 10, 1953 |
| 2,632,766 | De Benneville | Mar. 24, 1953 |

OTHER REFERENCES

Ritter et al.: "J. Am. Chem. Soc.," vol. 70 (1948), pp. 4045–50.

Benson et al.: "J. Am. Chem. Soc.," vol. 71 (1949), pp. 4128–30.

Plant et al.: "J. Am. Chem. Soc.," vol. 73, September 1951, pp. 4076–7.